United States Patent
Dietrich

(10) Patent No.: US 11,060,571 B2
(45) Date of Patent: Jul. 13, 2021

(54) METHOD AND DEVICE FOR DETERMINING THE ABSOLUTE POSITION OF A COMPONENT OF AN ACTUATOR ROTATING ABOUT A ROTATIONAL AXIS, IN PARTICULAR A CLUTCH ACTUATOR

(71) Applicant: Schaeffler Technologies AG & Co. KG, Herzogenaurach (DE)

(72) Inventor: Markus Dietrich, Oberkirch (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/604,405

(22) PCT Filed: Apr. 5, 2018

(86) PCT No.: PCT/DE2018/100306
§ 371 (c)(1),
(2) Date: Oct. 10, 2019

(87) PCT Pub. No.: WO2018/202237
PCT Pub. Date: Nov. 8, 2018

(65) Prior Publication Data
US 2020/0124118 A1   Apr. 23, 2020

(30) Foreign Application Priority Data
May 3, 2017   (DE) .......................... 10 2017 109 403.2

(51) Int. Cl.
*F16D 48/06* (2006.01)
*G01D 5/244* (2006.01)

(52) U.S. Cl.
CPC ......... *F16D 48/064* (2013.01); *F16D 48/066* (2013.01); *F16D 2500/1024* (2013.01);
(Continued)

(58) Field of Classification Search
CPC ................ F16D 48/064; F16D 48/066; F16D 2500/1024; F16D 2500/10412;
(Continued)

(56) References Cited

U.S. PATENT DOCUMENTS

| 5,337,868 A | 8/1994 | Liu et al. |
| 5,795,263 A | 8/1998 | Harries |

(Continued)

FOREIGN PATENT DOCUMENTS

| CN | 1082998 | 3/1994 |
| CN | 1125974 | 7/1996 |

(Continued)

OTHER PUBLICATIONS

Machine translation of EP2309230 filed Nov. 16, 20 (Year: 2020).*

*Primary Examiner* — Tisha D Lewis
(74) *Attorney, Agent, or Firm* — Volpe Koenig

(57) ABSTRACT

The invention relates to a method for determining the absolute position of a component of an actuator rotating about a rotational axis, in particular a clutch actuator, wherein the component has a co-rotating magnetic element (18), and the absolute position of the magnetic element (18) is detected by way of a multi-turn sensor (16) located opposite the magnetic element (18), which is supplied with a voltage. In a method, in which the absolute position can be detected without great constructional effort, a position of the magnetic element (18) is monitored by a Wiegand wire unit (19), which detects a movement of the component when the actuator (3, 12, 13) is turned off, and if a movement is detected, transmits a voltage pulse to the multi-turn sensor (16) for measuring the current position of the component.

12 Claims, 1 Drawing Sheet

(52) U.S. Cl.
CPC ............. *F16D 2500/1045* (2013.01); *F16D 2500/10412* (2013.01); *F16D 2500/3026* (2013.01); *F16D 2500/7041* (2013.01); *F16D 2500/7042* (2013.01)

(58) Field of Classification Search
CPC ..... F16D 2500/1045; F16D 2500/3026; F16D 2500/7041; F16D 2500/7042; G01D 5/24447
See application file for complete search history.

(56) References Cited

U.S. PATENT DOCUMENTS

| | | | |
|---|---|---|---|
| 6,191,687 B1 * | 2/2001 | Dlugos | G01F 15/065 307/419 |
| 8,326,490 B2 | 12/2012 | Burgdorf et al. | |
| 2007/0225890 A1 * | 9/2007 | Ringlstetter | B60T 7/085 701/70 |
| 2009/0189110 A1 | 7/2009 | Dolenti et al. | |
| 2011/0006757 A1 * | 1/2011 | Mehnert | G01P 3/4815 324/207.2 |
| 2011/0063145 A1 * | 3/2011 | Mayer | G01D 5/145 341/116 |
| 2014/0184030 A1 * | 7/2014 | Labriola, II | G01D 5/2451 310/68 B |
| 2015/0130450 A1 * | 5/2015 | Gehringer | G01D 5/3473 324/207.25 |
| 2015/0239501 A1 | 8/2015 | Fujita et al. | |
| 2017/0253267 A1 * | 9/2017 | Woodruff | B62D 5/0448 |
| 2017/0321766 A1 | 11/2017 | Dietrich | |
| 2018/0216965 A1 * | 8/2018 | Richard | G01D 5/145 |

FOREIGN PATENT DOCUMENTS

| | | |
|---|---|---|
| CN | 101158377 | 4/2008 |
| CN | 102971547 | 3/2013 |
| CN | 104110448 | 10/2014 |
| CN | 205678028 | 11/2016 |
| DE | 102005009489 | 8/2006 |
| DE | 102006014700 | 9/2007 |
| DE | 102013204752 A1 | 10/2013 |
| DE | 102013213948 | 2/2014 |
| DE | 102013222366 | 5/2014 |
| DE | 102014213620 | 2/2015 |
| DE | 102016204734 | 10/2016 |
| EP | 2309230 | 4/2011 |
| JP | H03-233317 A | 10/1991 |
| JP | 2003-004411 A | 1/2003 |
| JP | 2011-185711 A | 9/2011 |
| JP | 2015-049042 A | 3/2015 |
| JP | 2015-179070 A | 10/2015 |
| JP | 2018-500543 A | 1/2018 |
| WO | 9311369 | 6/1993 |
| WO | 2005113306 | 12/2005 |
| WO | 2016-070877 A1 | 5/2016 |

* cited by examiner

METHOD AND DEVICE FOR DETERMINING THE ABSOLUTE POSITION OF A COMPONENT OF AN ACTUATOR ROTATING ABOUT A ROTATIONAL AXIS, IN PARTICULAR A CLUTCH ACTUATOR

CROSS-REFERENCE TO RELATED APPLICATIONS

This application is a 371 National Phase of PCT/DE2018/100306, filed Apr. 5, 2018, which claims the benefit of German Patent Application No. 10 2017 109 403.2, filed May 3, 2017, both of which are incorporated by reference herein as if fully set forth.

BACKGROUND

The disclosure relates to a method for determining the absolute position of a component of an actuator rotating about a rotational axis, in particular a clutch actuator, wherein the component comprises a co-rotating magnetic element and the absolute position of the magnetic element is determined by a multi-turn sensor opposite to the magnetic element, which is supplied with a voltage.

In clutch actuation systems in motor vehicles, in particular in electrohydraulic clutch actuation systems, a piston of a master cylinder is driven by an electrically commutated electric motor, which is controlled by a control unit. Due to its position, the piston of the master cylinder transports a hydraulic fluid through a hydraulic line to a slave cylinder, which also comprises a piston that is displaced by the hydraulic fluid, thereby exerting a force on a coupling which is thus changed in position.

In order to precisely control the electric motor and thus to adjust an exact clutch position, an angular position of a rotor of the electrically commutated electric motor must be precisely measured. As can be seen from the applicant's unpublished patent application with the file number DE 10 2016 212 173.1, the angular position or the rotations of the rotor is/are monitored by a multi-turn sensor. Such a multi-turn sensor is directly connected to the supply voltage of the control unit in order to constantly detect the rotation of the magnet. A continuous current is necessary for said constant monitoring. If the sampling rate of the multi-turn sensor is too high, a very high current consumption is required. If the sampling rate is too low, a rotation of the rotor can be overlooked.

SUMMARY

It is therefore the object of the disclosure to specify a method for determining the absolute position of a rotating component of an actuator in which a simple, robust and cost-effective multi-turn sensor can be used.

According to the disclosure, the object is achieved by the fact that a position of the magnetic element is monitored by a Wiegand wire unit, which detects a movement of the component when the actuator is switched off and in the case of detected motion transmits a voltage pulse to the multi-turn sensor to measure the current position of the component. In in this case, a passive actuator movement can still be reliably detected by the Wiegand wire unit when the actuator is switched off. The multi-turn sensor is awakened by the voltage pulse and the changed position of the rotating component is measured. However, since the actuator rarely moves passively, the total power consumption of the multi-turn sensor is very low, so that a highly energy-saving and cost-effective variant of the multi-turn sensor can be used.

Advantageously, the multi-turn sensor is supplied with a voltage when the actuator is switched off. Due to the independence from a supply by a control unit, it is ensured that the multi-turn sensor to be awakened is functional at all times, so that even in the event of a passive movement of the actuator the change in the position of the rotating component can always be measured. Since little energy is consumed for this short-term measurement, the load on the battery is only minor.

In one embodiment, the multi-turn sensor changes from a standby state to an operating state after receiving the voltage pulse transmitted by the Wiegand wire unit. Thus, there is only a short-term connection to the battery, whereby the load on the battery by the multi-turn sensor is reduced.

In one variant, the multi-turn sensor will measure and store the current position of the component after receiving the voltage pulse transmitted by the Wiegand wire unit and will then revert to the standby state. As a result, the multi-turn sensor is only energized as long as the short-term measurement and storage process requires.

In one embodiment, the voltage pulse is triggered by the Wiegand wire unit only if the position of the magnetic element has changed by at least 180°. Thus, the multi-turn sensor is only placed in the measuring state in the event of noticeable changes in the angular position of the magnet element.

In one embodiment, when the actuator is switched on the multi-turn sensor is supplied with voltage by a supply voltage of a control unit and an angle of the component and/or rotations of the component is/are determined by the multi-turn sensor. The multi-turn sensor can thus reliably measure the position of the rotating component for each state of the actuator, so that when the normal operating state is switched on the current position of the rotating component is immediately available to the control unit.

A further development of the disclosure relates to a device for determining the absolute position of a component rotating about a rotational axis of an actuator, in particular a clutch actuator with a multi-turn sensor for determining the absolute position of a component comprising a magnetic element that follows the rotational movement of the component. In the case of a device in which a low-cost multi-turn sensor can be used and yet reliable monitoring of the angular position of the rotating component is guaranteed, for monitoring the position of the magnetic element a Wiegand wire unit is assigned thereto that is connected to a wake-up connection of sensor electronics of the multi-turn sensor in a standby state for transferring the multi-turn sensor to an operating state by a voltage pulse. This has the advantage that when the control unit is restarted, the current position of the actuator is always available thereto and thus a corresponding commutation of the electric motor can be carried out immediately.

Advantageously, when in the standby state the multi-turn sensor is connected to the battery. Thus, the multi-turn sensor is always in operational readiness and is thus independent of a supply voltage of the control unit.

In one embodiment, when in the operating state the multi-turn sensor is connected to a supply voltage of a control unit. Thus, the battery is spared in the normal operating state where the multi-turn sensor is often active.

BRIEF DESCRIPTION OF THE DRAWINGS

The disclosure allows numerous embodiments. One of these will be explained in more detail on the basis of the figures shown in the drawing.

In the figures.

DETAILED DESCRIPTION

Figure 1:
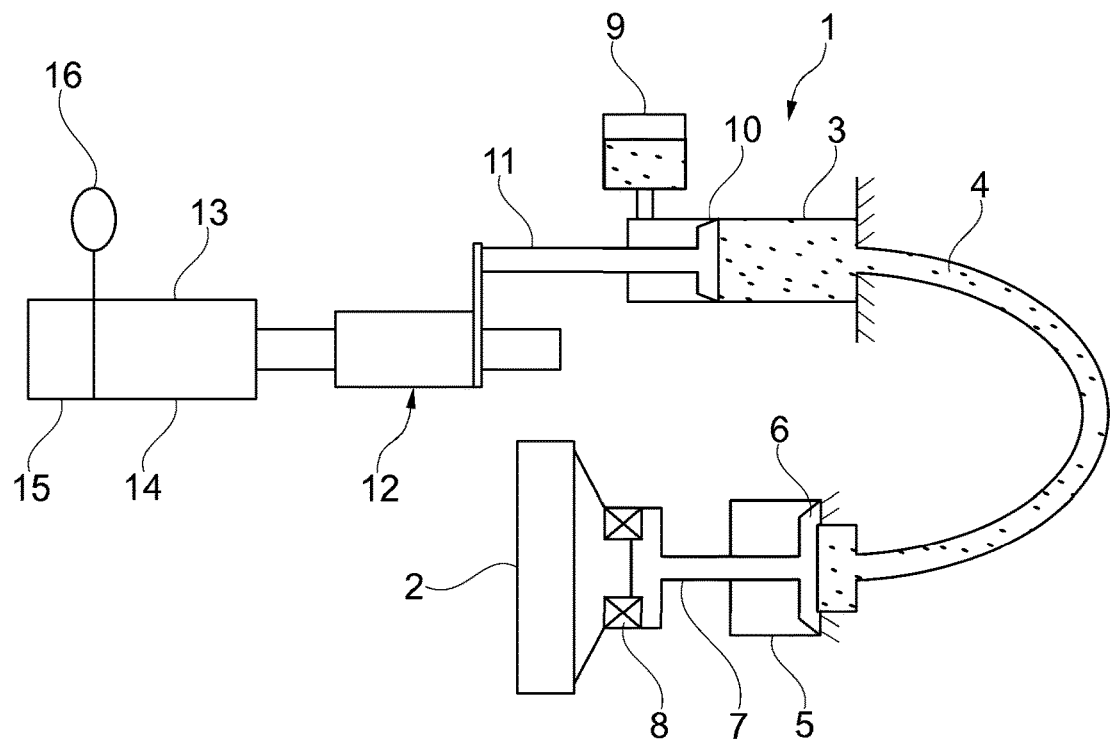
FIG. 1: shows a basic representation of a clutch actuation system for actuating an automated friction clutch.

In FIG. 1 a clutch actuation system 1 for an automated clutch is shown in a simplified form. The clutch actuation system 1 is associated with a friction clutch 2 in a power train of a motor vehicle and comprises a master cylinder 3 that is connected to a slave cylinder 5 via a hydraulic line that is referred to as a pressure line 4. In the slave cylinder 5, a slave piston 6 that can be moved reciprocally operates the friction clutch 2 via an operation element 7 with the interposition of a bearing 8.

The master cylinder 3 can be connected via a connection opening to a compensating container 9. In the master cylinder 3, a master piston is 10 axially movably mounted. A piston rod 11 of the master cylinder 3 is connected by a threaded spindle 12 to an electromotive actuating drive 13. The electromotive actuating drive 13 comprises an electric motor embodied as a commutated electric motor 14 and a control unit 15. The threaded spindle 12 converts a rotational movement of the electric motor 14 into a longitudinal movement of the master piston 10 of the master cylinder 3. The friction clutch 2 is thus automatically operated by the electric motor 14, the threaded spindle 12, the master cylinder 3 and the slave cylinder 5.

Figure 2:
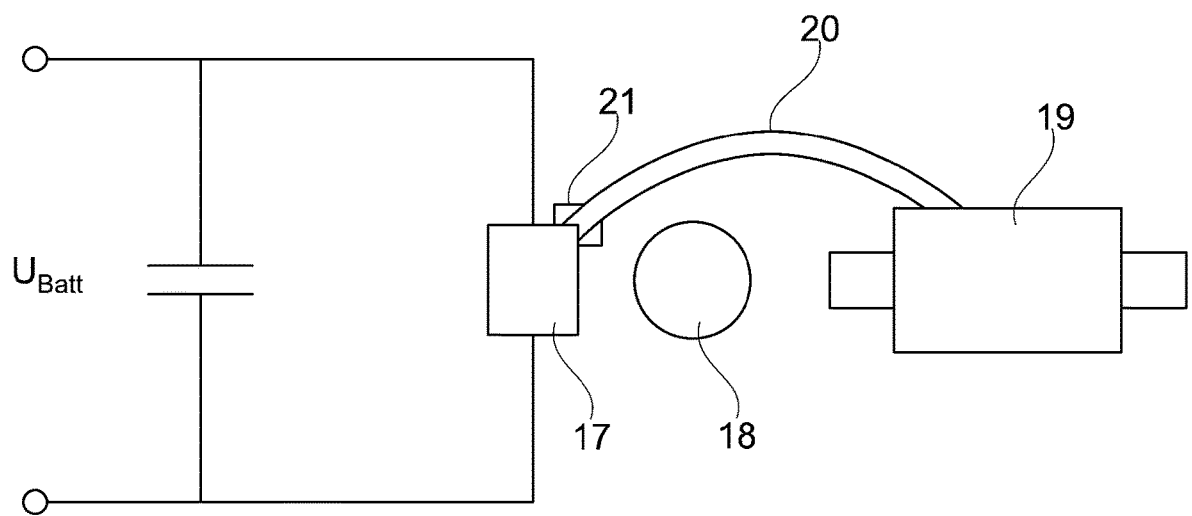
FIG. 2: shows an exemplary embodiment of the device according to the disclosure.

Since the electric motor 14 is an electrically commutated DC motor, it is necessary to know its absolute position for the position control of the electric motor 14. This absolute position is detected by a multi-turn sensor 16. When in the normal operating state, the multi-turn sensor 16 is connected to the control unit 15 and is supplied by the supply voltage of the control unit. The multi-turn sensor 16 is part of a chip 17, as is shown in FIG. 2. The chip 17 is arranged so that the multi-turn sensor 16 is opposite the rotor of the electric motor 14. In FIG. 2, for the sake of clarity a magnetic element 18 of the electric motor 14 is shown, which is firmly attached to an end face of the rotor of the electric motor 14 and which follows the rotational movement thereof. The magnetic element 18 is monitored by an opposite Wiegand wire unit 19 that is connected via a line 20 to a wake-up connection 21 of the chip 17 of the multi-turn sensor 16. In addition, the chip 17 of the multi-turn sensor 16 is coupled to the battery voltage $U_{Batt}$.

In normal operation of the actuator 3, 12, 13, the chip 17 is connected to the supply voltage of the control unit 15 and determines the angle of the magnetic element 18 and counts the rotations of the magnetic element in the process. Said rotations are necessary to adjust the commutation of the electric motor 14 correctly.

However, if the actuator 3, 12, 13 is switched off, then the supply voltage supplying the control unit 15 and the multi-turn sensor 16 is also switched off.

In this case, the multi-turn sensor 16 is in a standby state, which is maintained by the battery voltage $U_{Batt}$. In this switched-off state of the actuator 3, 12, 13 it can happen that the position of the rotor of the electric motor 14 changes passively. In this case, the change in the angle of the magnetic element 18 is detected by the Wiegand wire unit 19. Said Wiegand wire unit 19 is a sensor that comprises Wiegand wires as an essential component that comprise a hysteresis curve with pronounced steps as a result of parallel soft and hard magnetic areas, which is known as the Wiegand effect. The sudden change in the magnetization caused by the change in position of the magnetic element 18 of the rotor of the electric motor 14 causes a voltage pulse in a coil near the wires. This voltage pulse is forwarded via the line 20 to the chip 17, whereby the multi-turn sensor 16 is awakened. The voltage pulse from the Wiegand wire unit 19 is triggered at the latest after a change in the position of 180° of the magnetic element 18 if the magnetic element 18 contains two-pole magnets. By means of the voltage pulse, the multi-turn sensor 16 changes from the standby state to the normal operating state thereof. In said normal operating state, the new position of the magnetic element 18 is measured and stored. Then the multi-turn sensor 16 is returned to the standby state.

REFERENCE LIST

1 Clutch actuation system
2 Friction clutch
3 Master cylinder
4 Hydraulic line
5 Slave cylinder
6 Slave piston
7 Actuating element
8 Bearing
9 Compensation container
10 Master piston
11 Piston rod
12 Threaded spindle
13 Actuation drive
14 Electric motor
15 Control unit
16 Multiturn sensor
17 Chip
18 Magnetic element
19 Wiegand wire unit
20 Line
21 Wake-up connection

The invention claimed is:

1. A method for determining an absolute position of a component of an actuator rotating about a rotational axis, wherein the component comprises a rotating magnetic element, the method comprising:
   providing a multi-turn sensor opposite to the rotating magnetic element configured to determine the absolute position of the magnetic element;
   supplying a voltage to the multi-turn sensor;
   monitoring a position of the magnetic element, by a Wiegand wire unit, which detects a movement of the component when the actuator is switched off;
   supplying the multi-turn sensor with voltage by a battery when the actuator is switched off and the multi-turn sensor is in a standby state;
   in the event of detected motion, transferring a voltage pulse from the Wiegand wire unit directly to the multi-turn sensor for measuring a current position of the component; and
   changing the multi-turn sensor from the standby state to an operating state after receiving the voltage pulse transmitted from the Wiegand wire unit.

2. The method as claimed in claim 1, further comprising the multi-turn sensor measuring and storing the current position of the component and then returning to the standby state.

3. The method as claimed in claim 1, further comprising triggering the voltage pulse by the Wiegand wire unit when the position of the magnetic element has changed by at least 180°.

4. The method as claimed in claim 1, further comprising that when the actuator is switched on, supplying the multi-turn sensor with voltage by a supply voltage of a control unit and determining at least one of an angle of the component or rotations of the component by the multi-turn sensor.

5. A device for determining an absolute position of a component rotating about a rotational axis of an actuator, the device comprising:
   a multi-turn sensor configured to determine the absolute position of the component which comprises a magnetic element that follows a rotational movement of the component;
   a Wiegand wire unit configured to monitor the position of the magnetic element, the Wiegand wire unit is connected to a wake-up connection of sensor electronics of the multi-turn sensor in a standby state and is adapted to change the multi-turn sensor to an operating state by transferring a voltage pulse directly to the multi-turn sensor; and
   a battery configured to supply the multi-turn sensor with voltage when the actuator is switched off and the multi-turn sensor is in the standby state.

6. The device as claimed in claim 5, wherein when in the operating state the multi-turn sensor is connected to a supply voltage of a control unit.

7. The method of claim 1, wherein the actuator is a clutch actuator.

8. The device of claim 5, wherein the actuator is a clutch actuator.

9. A method for determining an absolute position of a rotating component of an actuator that rotates about a rotational axis, the method comprising:
   providing a magnetic element on the rotating component;
   providing a multi-turn sensor opposite to the magnetic element, the multi-turn sensor being configured to determine the absolute position of the magnetic element
   supplying a voltage to the multi-turn sensor via a battery when the actuator is switched off and the multi-turn sensor is in a standby state;
   monitoring a position of the magnetic element, using a Wiegand wire unit, which detects a movement of the component when the actuator is switched off;
   upon detecting a motion, the Wiegand wire unit transferring a voltage pulse to a wake-up connection of the multi-turn sensor for measuring a current position of the component; and
   changing the multi-turn sensor from the standby state to an operating state after receiving the voltage pulse transmitted from the Wiegand wire unit.

10. The method of claim 9, further comprising the multi-turn sensor measuring and storing the current position of the component and then returning to the standby state.

11. The method of claim 9, further comprising triggering the voltage pulse by the Wiegand wire unit when the position of the magnetic element has changed by at least 180°.

12. The method of claim 9, further comprising the Wiegand wire unit switching on the actuator, supplying the multi-turn sensor with voltage by a supply voltage of a control unit, and determining at least one of an angle of the component or rotations of the component using the multi-turn sensor.

* * * * *